United States Patent
Takahashi (10) Patent No.: US 6,704,051 B1
(45) Date of Patent: Mar. 9, 2004

(54) PHOTOELECTRIC CONVERSION DEVICE CORRECTING ABERRATION OF OPTICAL SYSTEM, AND SOLID STATE IMAGE PICK-UP APPARATUS AND DEVICE AND CAMERA USING PHOTOELECTRIC CONVERSION DEVICE

(75) Inventor: Hidekazu Takahashi, Isehara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/215,170

(22) Filed: Dec. 18, 1998

(30) Foreign Application Priority Data

Dec. 25, 1997 (JP) .............................. 9-357634

(51) Int. Cl.[7] .......................... H04N 3/14; H04N 5/335
(52) U.S. Cl. ..................................... 348/315; 348/311
(58) Field of Search ................................. 348/335, 340, 348/241, 315, 294, 311; 358/513, 482, 483; 257/294

(56) References Cited

U.S. PATENT DOCUMENTS

| 4,204,230 | A | * | 5/1980 | Sprague ...................... 348/311 |
| 4,467,361 | A | | 8/1984 | Ohno et al. ................. 358/213 |
| 5,489,940 | A | * | 2/1996 | Richardson et al. ........ 348/315 |
| 6,201,574 | B1 | * | 3/2001 | Martin ........................ 348/315 |
| 6,377,305 | B2 | * | 4/2002 | Onuki ......................... 348/345 |

FOREIGN PATENT DOCUMENTS

| EP | 0 786 814 | 7/1997 | |
| JP | 1-94776 | 4/1989 | |
| JP | 1-119178 | 5/1989 | |
| JP | 01119178 A | * 5/1989 | .......... H04N/5/335 |
| JP | 6-237413 | 8/1994 | |
| JP | 6-252375 | 9/1994 | |
| JP | 7-50401 | 2/1995 | |

OTHER PUBLICATIONS

Patent Abstracts of Japan, vol. 13, No. 330 (E–793) (English Abstract of JP 01 094776, Apr. 13, 1989), published Jul. 25, 1989.

Patent Abstracts of Japan, vol. 13, No. 359 (E–804) (English Abstract JP 01 119178, May 11, 1989), published Aug. 10, 1989.

Patent Abstracts of Japan, vol. 18, No. 623 (E–1635) (English Abstract JP 06 237413, Aug. 23, 1994), published Nov. 28, 1994.

* cited by examiner

Primary Examiner—Wendy R. Garber
Assistant Examiner—Justin Misleh
(74) Attorney, Agent, or Firm—Fitzpatrick, Cella, Harper & Scinto (57) ABSTRACT

To correct aberration generated in the optical system of an image pickup device on a photoelectric conversion device and correct light amount nonuniformity generated in the optical system, as the characteristic feature of the photoelectric conversion device, the aperture positions where photoelectric conversion is performed are different from each other in a photoelectric conversion area. The aperture ratio of the aperture region where photoelectric conversion is performed is changed in units of arrangement positions. The pitch of pixels is shifted to shift the position of the aperture region, or the pattern of a light-shielding layer is shifted stepwise to shift the position of the aperture region. Alternatively, the pitch of a pixel string in the horizontal or vertical direction is changed, and the pattern of the light-shielding layer is changed stepwise to shift the aperture position in both the horizontal and vertical directions in a plane.

9 Claims, 6 Drawing Sheets

PHOTOELECTRIC CONVERSION DEVICE CORRECTING ABERRATION OF OPTICAL SYSTEM, AND SOLID STATE IMAGE PICK-UP APPARATUS AND DEVICE AND CAMERA USING PHOTOELECTRIC CONVERSION DEVICE

BACKGROUND OF THE INVENTION

1. Field of the Invention

The present invention relates to a photoelectric conversion device for photoelectrically converting light incident through an optical system such as a lens, and an image pickup device and autofocus camera using the same, including, e.g., the optical system.

2. Related Background Art

Figure 1:
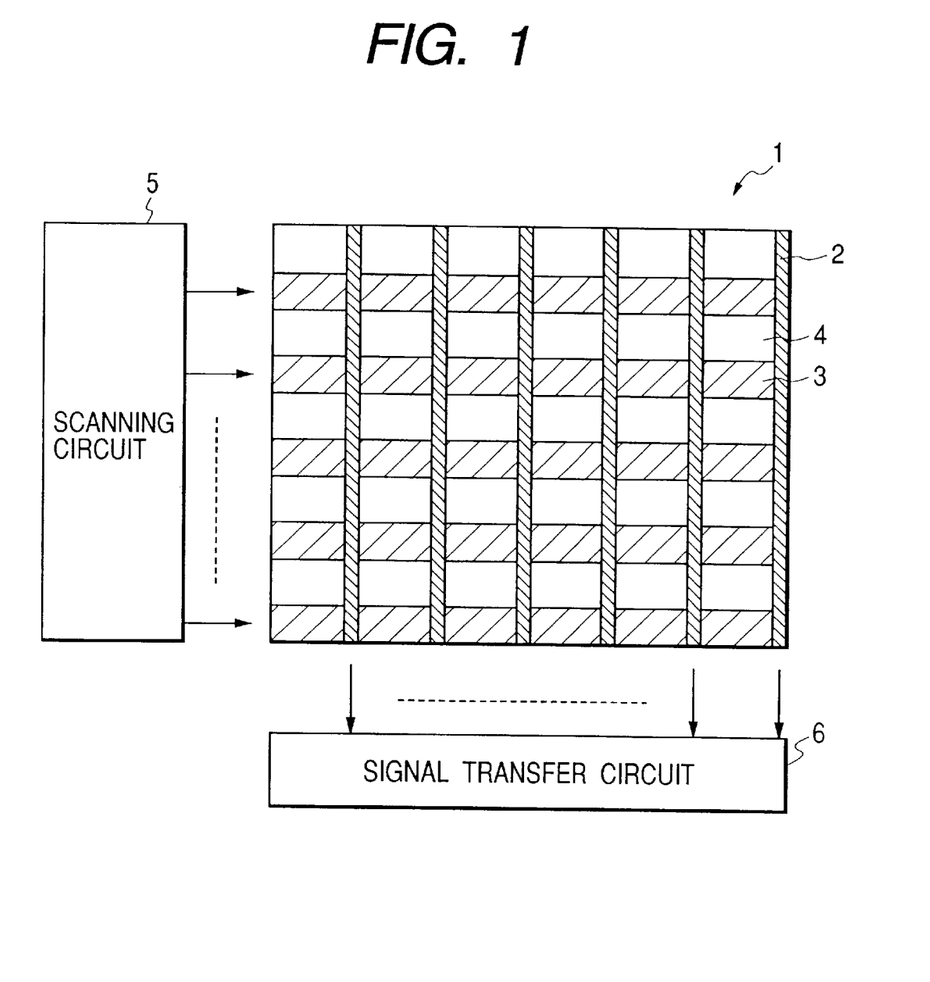
FIG. 1 is a plan view of a conventional photoelectric conversion device.

A conventional photoelectric conversion device having two-dimensionally arrayed photoelectric conversion elements has an arrangement shown in FIG. 1. Referring to FIG. 1, the device comprises pixels 1 as photoelectric conversion elements, output lines 2, light-shielding films 3, aperture regions 4, a scanning circuit 5, and a signal transfer circuit 6. The pixels 1 are two-dimensionally arrayed at a predetermined pitch. Each aperture 4 has the same shape and same area as those of the corresponding pixel 1 and is formed at the same position as that of the pixel 1.

The scanning circuit 5 scans the two-dimensionally arrayed pixels 1 in the horizontal and vertical directions and outputs signals to the signal transfer circuit 6.

In the conventional photoelectric conversion device, two-dimensionally photoelectrically converted signals are time-serially output from the signal transfer circuit 6, processed in accordance with a standard such as NTSC or HDTV, and output to an external device. After this, the signals are processed by an external signal processing circuit and reproduced on a TV or monitor. In this case, the image formed on the photoelectric conversion device can be reproduced on a TV monitor in a one-to-one correspondence. Unless the image pickup lens has any aberrations, an accurate image can be reproduced.

In the prior art, however, when the optical system has aberrations, and this device is used for the autofocus (AF) sensor of a camera, the following problems are posed.

As an AF light beam, the light image of an object to be photographed is input. The light beam is focused by an objective lens and then sent to the photoelectric conversion device while changing the direction of the beam by a plurality of reflection mirrors, thereby focusing the objective lens on the object. In the process in which the light beam is reflected by each reflection mirror and focused, it is distorted due to aberrations of the mirrors and objective lens. For example, when the object to be photographed has a rectangular pattern, the light beam is curved and focused on the photoelectric conversion device as an AF sensor. This distortion is conventionally corrected using an image signal processing circuit inserted after the signal transfer circuit, or by signal processing software. However, the correction is insufficient.

When an image is reproduced through the conventional sensor, an image to be reproduced in a rectangular shape curves. This results in disadvantages in subsequent signal processing and makes it difficult to perform accurate AF operation.

SUMMARY OF THE INVENTION

It is the first object of the present invention to correct, on a photoelectric conversion device, aberration generated in the optical system of an image pickup device.

It is the second object of the present invention to correct, on a photoelectric conversion device, light amount nonuniformity in an optical system, such as a decrease in marginal light amount of a lens.

In order to achieve the above object, according to an aspect of the present invention, an aperture position of each photoelectric conversion element differs from that of an adjacent aperture position in a photoelectric conversion region in correspondence with aberration in an optical system of an actually used image pickup device. According to another aspect of the present invention, an aperture ratio of an aperture region of each photoelectric conversion element is changed in units of arrangement positions in a photoelectric conversion region in correspondence with an amount of light focused on a photoelectric conversion device.

In the above arrangement, since each aperture of the photoelectric conversion device is arranged in correspondence with actual aberration in the optical system, aberration of an image due to the optical system is corrected on the photoelectric conversion device. In addition, by setting the aperture ratio of each aperture in correspondence with the light amount in the optical system, the same output level can be obtained in irradiating light in the same amount.

Other objects, features, and advantages of the invention will be apparent from the following specification and accompanying drawings.

DESCRIPTION OF THE PREFERRED EMBODIMENTS

Figure 2:
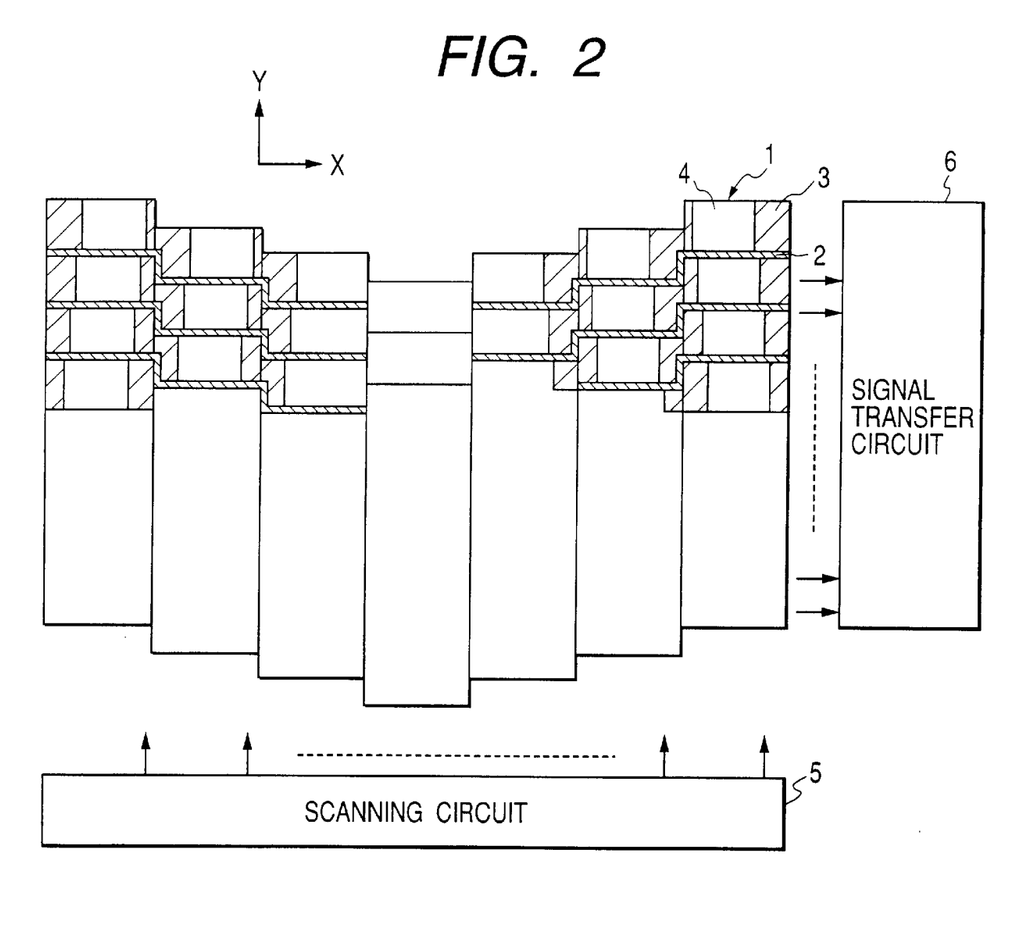
FIG. 2 is a schematic view of the first embodiment of the present invention.

The first embodiment of the present invention will be described in detail with reference to the accompanying drawings. FIG. 2 is a plan view of a photoelectric conversion device as the most characteristic feature of the present invention. Referring to FIG. 2, the device comprises pixels 1 as photoelectric conversion elements, AL output interconnections 2 as output lines, AL2 interconnections 3 as light-shielding films, aperture regions 4 as regions where light is incident, a scanning circuit 5 for driving the photoelectric conversion elements, and a signal transfer circuit 6 for outputting signals from the pixels 1 to an external device. The pixels 1 as photoelectric conversion elements are two-dimensionally arrayed in an m x n matrix to allow two-dimensional image pickup.

Figure 3:
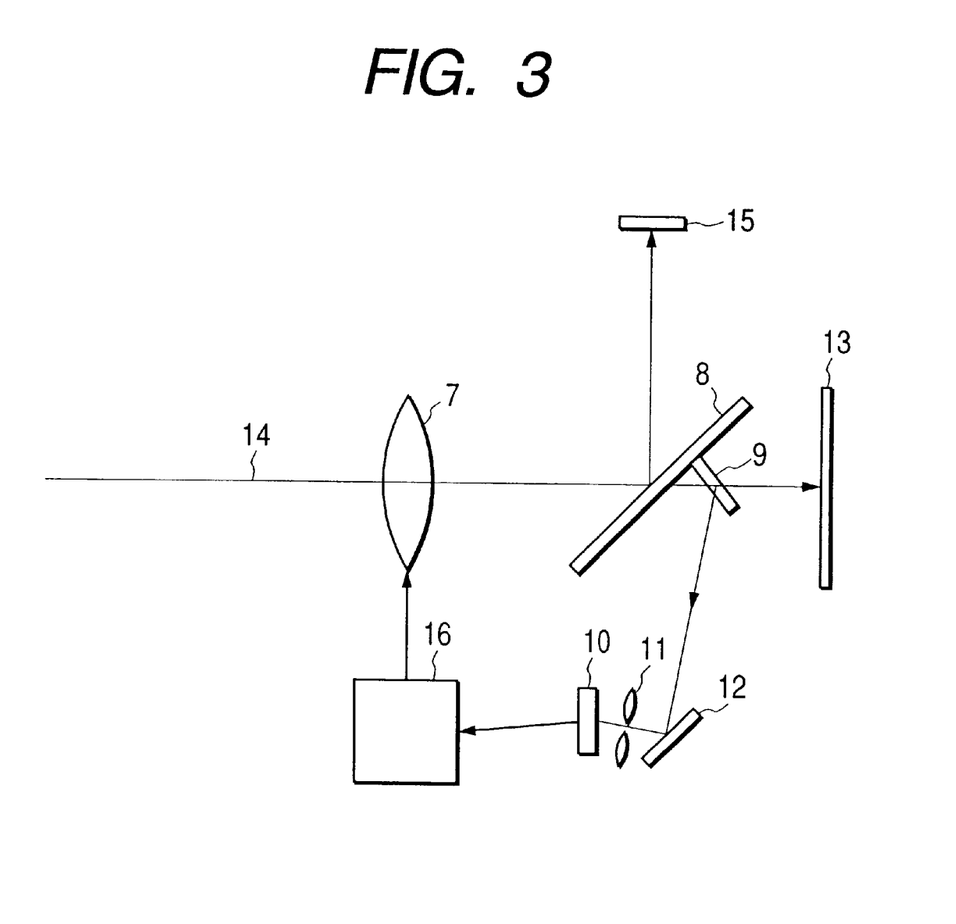
FIG. 3 is a schematic view showing an autofocus optical system used in the present invention.

FIG. 3 shows the simple optical system of a single-lens reflex camera using the above-described photoelectric conversion device. Referring to FIG. 3, the optical system comprises a lens 7 for focusing an image, a quick return mirror 8 for reflecting light to a view finder 15, a submirror 9 for reflecting light to an AF (autofocus) system, an AF sensor 10 as the photoelectric conversion device, an eyeglass lens 11, a mirror 12 for guiding light to the AF sensor 10, a focal plane shutter 13, a principal axis 14 of a light beam, and a control device 16 for adjusting the lens 7 on the basis of a signal from the photoelectric conversion device 10.

Figure 4:
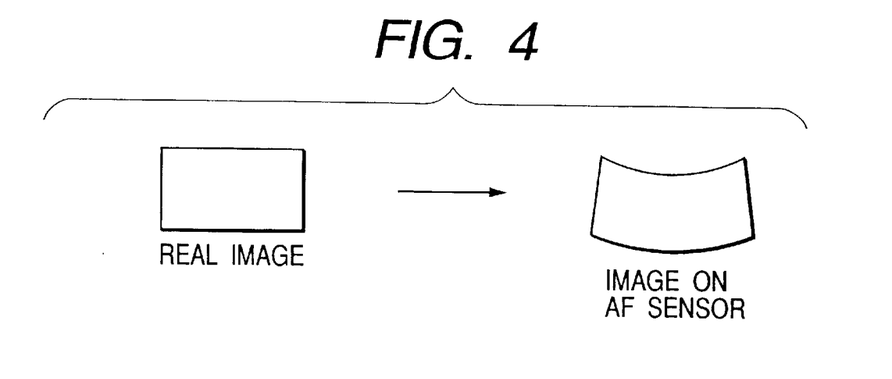
FIG. 4 is a view showing an example of image formation as a solution to the problem realized by the present invention.

In this embodiment, an image actually formed on the AF sensor 10 curves in correspondence with the rectangular real image as an object, as shown in FIG. 4. As the characteristic feature of this embodiment, the apertures are formed in a curve pattern, as shown in FIG. 2, to correct the distortion.

Figure 5:
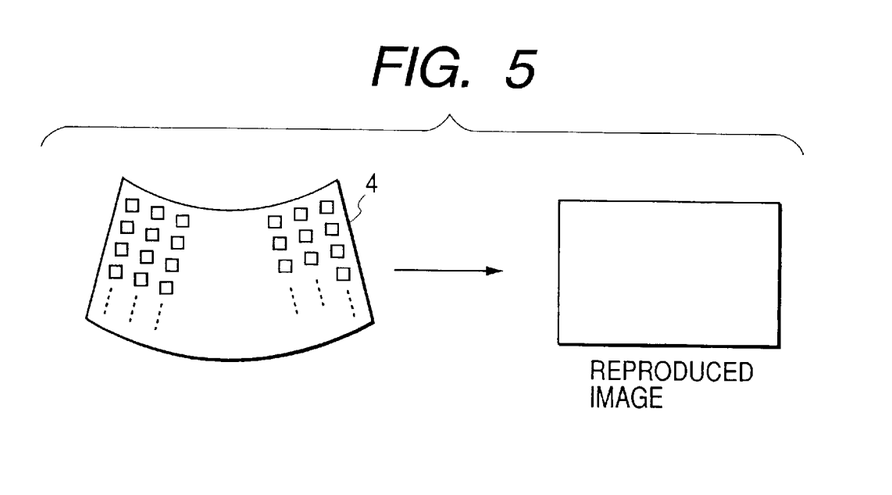
FIG. 5 is a view showing the concept of the present invention.

Referring to FIG. 2, to correct aberration concave in the Y direction, each pixel string in the Y direction is shifted with respect to an adjacent pixel string by 0.5 to 1.0 pixel. In addition, to correct downward aberration in the X direction, the light-shielding regions 3 are formed to spread downward. Since the aperture regions are formed at positions capable of correcting the X- and Y-direction aberrations of the optical system, as shown in FIG. 4, aberrations in the optical system can be corrected on the photoelectric conversion device. (FIG. 5 is a view showing the concept of the present invention.) In this embodiment, output shading can also be reduced because the aperture ratios (the aperture ratio being a ratio between the area of a pixel and the area of the aperture) of the pixels 1 are raised toward the peripheral portion in correspondence with the actual optical system.

According to this embodiment, a two-dimensional photoelectric conversion device capable of correcting, on the photoelectric conversion device, aberrations of image formation position and light amount nonuniformity of the optical system can be realized, so the AF accuracy can be improved, the signal processing circuit can be simplified, and cost of the optical system can be reduced.

In this embodiment, each pixel has a rectangular shape. However, the same effect as described above can be obtained even when each pixel has any other shape such as a square shape. The photoelectric conversion elements can be applied to sensors of any types including a CMOS sensor, CCD, BASIS, CMD, and SIT.

In this embodiment, the photoelectric conversion device is used as an AF sensor as an application example. This embodiment aims at correcting distortion in the optical system using the pixel arrangement of the sensor. Therefore, the photoelectric conversion device can be appropriately applied to a video camera or digital camera as far as it reads the image of an object using a lens.

Figure 6:
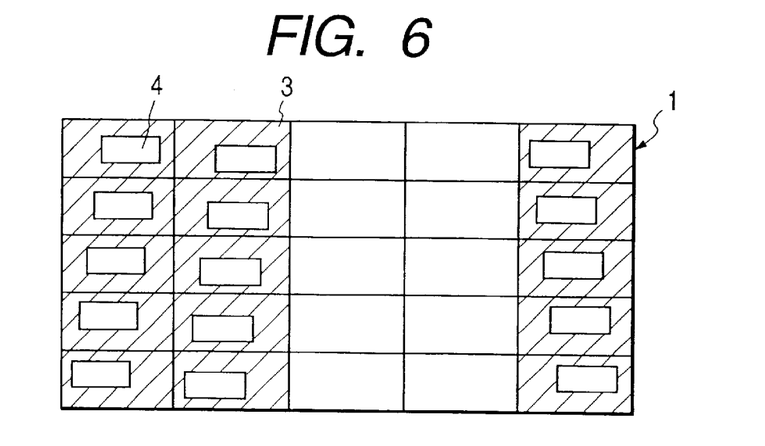
FIG. 6 is a schematic view of the second embodiment of the present invention.

FIG. 6 shows the second embodiment of the present invention. As the characteristic feature of this embodiment, pixels 1 are arrayed in a rectangle, and aperture regions 4 are formed to curve only by changing the pattern of each light-shielding layer 3.

In this embodiment, if the area and pixel sensitivity of each aperture region 4 do not change, the pixel size must be made larger than that in the first embodiment. However, the aperture positions can be changed only by the pattern of each light-shielding layer 3, so a sensor compatible with various optical systems can be realized only by changing the light-shielding layers 3.

For example, in each rectangular pixel 1 shown in FIG. 6, aperture regions 4 are formed at positions on the upper, lower, left, or right side to correct distortion in the optical system. The light-shielding layer 3 is formed at portions other than the aperture regions. The distortion cannot be completely corrected owing to the factor of area. However, since generation of distortion in the optical system is prevented to a certain extent by optical means, compensation by an image processing circuit after image reading can be decreased by this embodiment, and the cost can also be reduced.

Figure 7A:
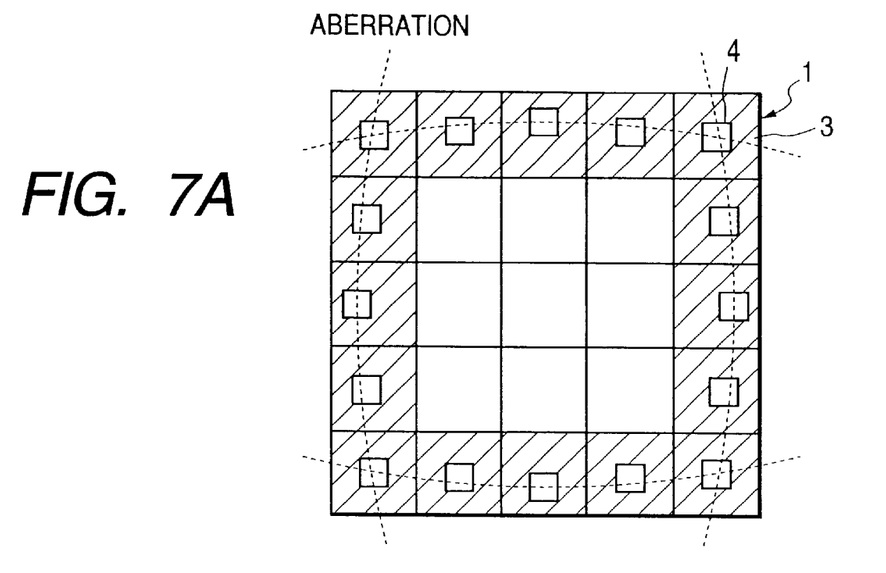
FIGS. 7A and 7B are schematic views of the third embodiment of the present invention.
Figure 7B:
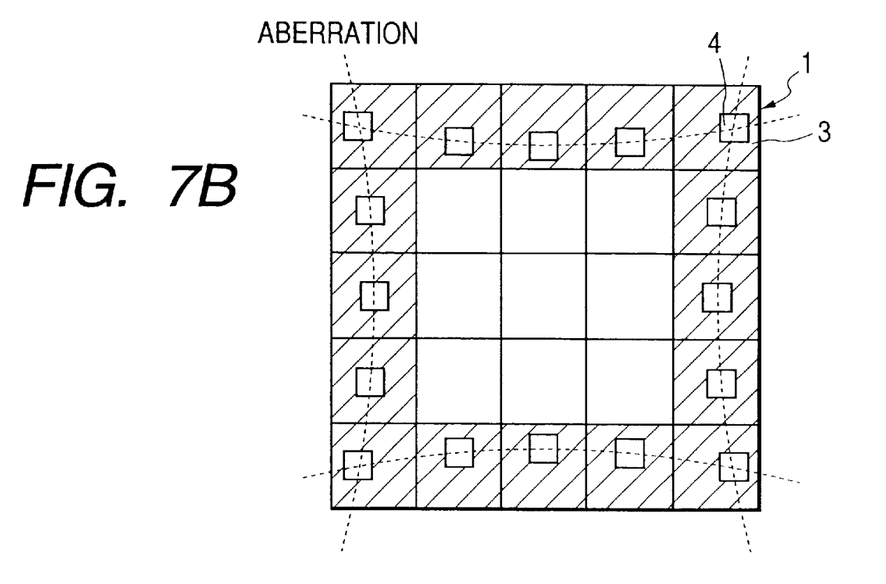

FIGS. 7A and 7B show the third embodiment of the present invention. Referring to FIGS. 7A and 7B, a pixel 1 as a photoelectric conversion element has a light-shielding layer 3 and an aperture region 4. A scanning line region (not shown) is partially formed under the light-shielding layer 3. A driving circuit or image read circuit for operation are mounted around the pixels.

In this embodiment, the photoelectric conversion device is used for a video camera, SV (still video) camera, or the like. Normally, when an inexpensive optical system is used, barrel- or pincushion-shaped aberration is generated. If the image is reproduced without being corrected, the aberration appears in the reproduced image, resulting in poor image quality.

In this embodiment, by forming apertures in consideration of the expected aberration, correction is performed on the photoelectric conversion device, and the characteristics of the reproduced image can be improved.

FIG. 7A shows an arrangement for correcting barrel-shaped aberration. FIG. 7B shows an arrangement for correcting pincushion-shaped aberration. To correct barrel-shaped aberration, aperture regions 4 having the same area are formed in correspondence with the barrel-shaped aberration, and light-shielding layers 3 are formed at portions other than the aperture regions. To correct pincushion-shaped aberration, aperture regions 4 having the same area are formed in correspondence with the pincushion-shaped aberration, and light-shielding layers 3 are formed at portions other than the aperture regions. In this embodiment, the aperture position is changed by changing the light-shielding pattern. However, even when the pixel arrangement itself is changed, the same effect as described above can be obtained.

In this embodiment, even when an inexpensive image pickup system is used, a sensed image with minimum aberration can be obtained.

In the above embodiments, the arrangement of photoelectric conversion elements or pattern of the light-shielding layer has been mainly described. The photoelectric conversion device and, more particularly, each pixel can be easily manufactured by a semiconductor manufacturing technology in which the pattern of an aperture region and light-shielding layer is accurately formed by photolithography using a mask such that aberrations such as spherical aberration, astigmatism, curvature of field, coma, and distortion in the optical system including the lens and mirror are corrected, and the object shape itself can be directly expressed on a display.

Figure 8:
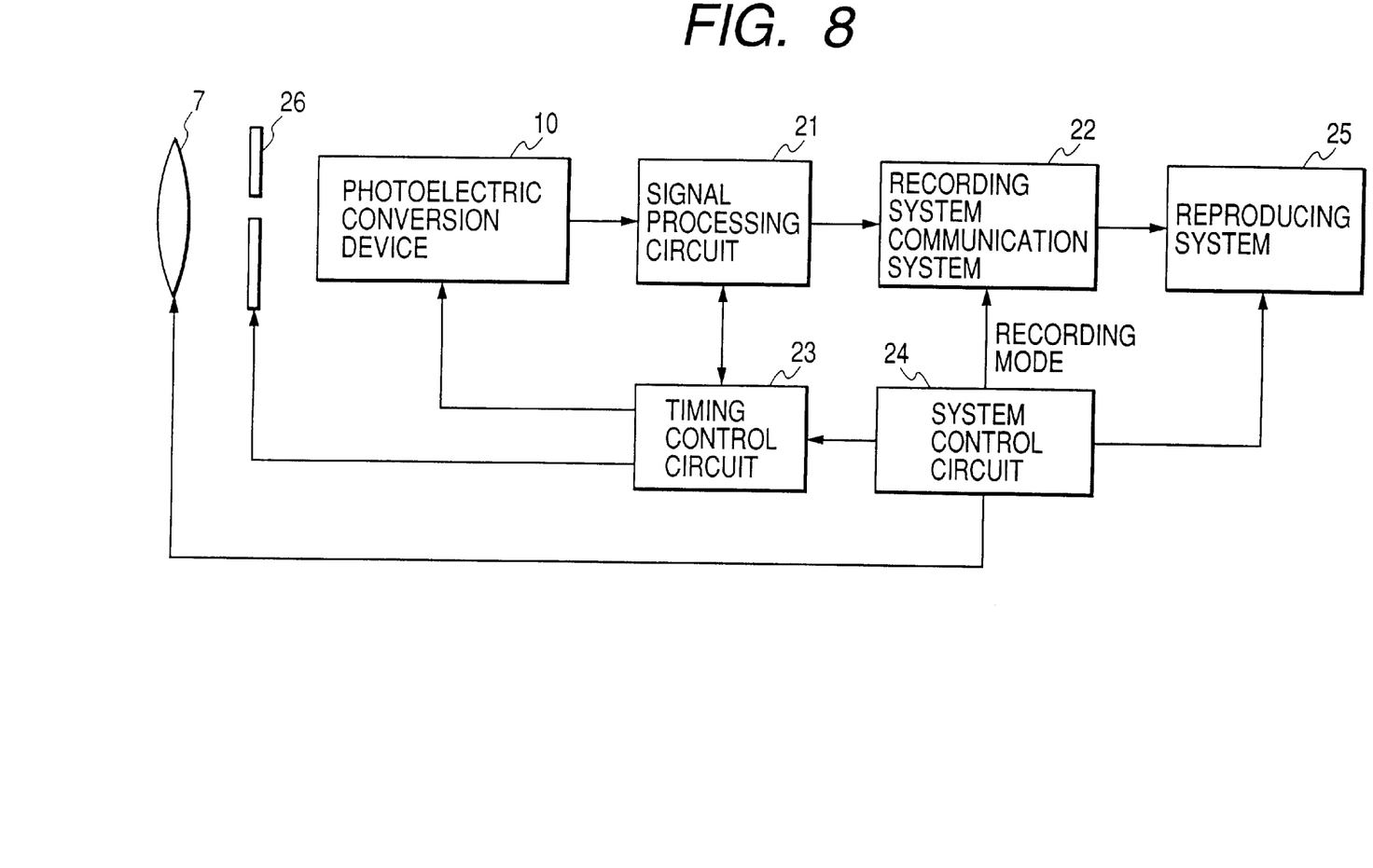
FIG. 8 is an image pickup device using one of the photoelectric conversion devices of the first to third embodiments of the present invention.

FIG. 8 shows, as the fourth embodiment, an image pickup device using one of the photoelectric conversion devices described in the first to third embodiments. As shown in FIG. 8, the image of light incident through an optical system 7 and a stop 26 is formed on a photoelectric conversion device 10. The light information is converted into an electrical signal by a pixel array on the photoelectric conversion device 10 and output. The output signal is converted by a signal processing circuit 21 on the basis of a predetermined scheme and output. The processed signal is recorded or transferred by an information recording device in a recording system/communication system 22. The recorded or transferred signal is reproduced by a reproducing system 25. The stop 26, photoelectric conversion device 10, and signal processing circuit 21 are controlled by a timing control circuit 23. The optical system 7, timing control circuit 23, recording system/communication system 22, and reproducing system 25 are controlled by a system control circuit 24.

As has been described above, according to the first to fourth embodiments, aberration in the optical system can be corrected on the photoelectric conversion device, so the optical system, and the signal processing circuit or software can be simplified, and the image reproduction accuracy can be improved.

Therefore, a solid-state image pickup device capable of processing an image at high accuracy and low cost as compared to the prior art can be realized.

Many widely different embodiments of the present invention may be constructed without departing from the spirit and scope of the present invention. It should be understood that the present invention is not limited to the specific embodiments described in the specification, except as defined in the appended claims.

What is claimed is:

1. A photoelectric conversion device comprising a plurality of pixel arrays each of which includes an arrangement, in a line, of pixels whose aperture areas are shifted from each other, in a direction different from the arrangement direction of the pixels, wherein the pixel arrays adjacent to each other are shifted from each other in the arrangement direction.

2. A device according to claim 1, wherein the pixel arrays adjacent to each other are shifted from each other by an amount smaller than a width of one pixel.

3. A device according to claim 1, wherein the aperture areas of the pixels include in a pixel array of the plurality of pixel arrays are shifted from each other by shifting a position of a light shielding layer include in each of the pixels.

4. A device according to claim 1, wherein the pixels of the plurality of pixel arrays are provided with the same pixel layout.

5. A photoelectric conversion device according to claim 1, wherein said plurality of pixel arrays are arranged, such that the aperture areas of the pixels at one side of the pixel arrays are arranged at mutually different intervals, and the aperture areas of the pixels at an opposite side of the pixel arrays are at mutually different intervals.

6. A solid state image pick-up apparatus comprising:

a photoelectric conversion device according to claim 1, a scanning circuit, arranged to drive said photoelectric conversion device; and a signal transfer circuit, arranged to externally output a signal from said photoelectric conversion device.

7. An image pick-up device comprising:

a photoelectric conversion device according to claim 1, and an optical system, arranged to guide light to said photoelectric conversion device, wherein the position of the aperture areas are determined so as to correct aberration of said optical system.

8. An image pick-up device comprising:

a photoelectric conversion device according to claim 1, and a signal processing circuit, arranged to process a signal from said photoelectric conversion device.

9. A camera comprising:

a photoelectric conversion device according to claim 1, a lens for focusing light on said photoelectric conversion device; and a control device, arranged to adjust said lens on the basis of a signal from said photoelectric conversion device.

* * * * *

UNITED STATES PATENT AND TRADEMARK OFFICE
CERTIFICATE OF CORRECTION

PATENT NO. : 6,704,051 B1
DATED : March 9, 2004
INVENTOR(S) : Hidekazu Takahashi It is certified that error appears in the above-identified patent and that said Letters Patent is hereby corrected as shown below:

Column 1,
Line 26, the left margin should be closed up.

Column 5,
Lines 35 and 37, "include" should read -- included --.

Signed and Sealed this

Third Day of August, 2004

JON W. DUDAS
*Acting Director of the United States Patent and Trademark Office*